United States Patent
Lee (10) Patent No.: US 10,528,022 B2
(45) Date of Patent: Jan. 7, 2020

(54) POSITION CONTROL DEVICE BASED ON PROGRAMMABLE LOGIC CONTROLLER

(71) Applicant: LSIS CO., LTD., Anyang-si, Gyeonggi-do (KR)

(72) Inventor: Sang-Back Lee, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 16/223,714

(22) Filed: Dec. 18, 2018

(65) Prior Publication Data

US 2019/0332080 A1    Oct. 31, 2019

(30) Foreign Application Priority Data

Apr. 25, 2018 (KR) .................... 10-2018-0047898

(51) Int. Cl.
*G05B 19/05* (2006.01)
*H02P 8/10* (2006.01)

(52) U.S. Cl.
CPC ............... *G05B 19/05* (2013.01); *H02P 8/10* (2013.01); *G05B 2219/13001* (2013.01)

(58) Field of Classification Search
CPC ........ G05B 11/01; G05B 13/00; G05B 19/40; G05B 19/10; G05B 19/42; G05B 19/19; G05B 19/416; G05B 19/04; G05B 19/408; G05B 19/18; G05B 11/00; G05B 19/402; G05B 19/056; G05B 19/05; B25J 9/16; B25J 9/18; B25J 5/00; B25J 9/22; H02P 6/00; H02P 6/14; H02P 1/00; H02P 1/46;

(Continued)

(56) References Cited

U.S. PATENT DOCUMENTS 6,865,425 B2 * 3/2005 McNutt ................. G05B 11/28
                                                                329/312
7,003,681 B2    2/2006 Wu
            (Continued)

FOREIGN PATENT DOCUMENTS

EP      0393650 A2    10/1990
KR    100777928 B1    11/2007

OTHER PUBLICATIONS

European Search Report for related European Application No. 18214256.2; action dated Jun. 5, 2019; (8 pages).

*Primary Examiner* — Antony M Paul
(74) *Attorney, Agent, or Firm* — K&L Gates LLP (57) ABSTRACT

The present disclosure provides a device for controlling a position based on a programmable logic controller (PLC), the device comprising: a motor driving module; an input module; and a control module, wherein the control module includes: a profile creation unit configured for creating the position profile based on the position command when a first position calculation interrupt is generated in a first position control period; a pulse calculation unit configured for calculating a number of outputs of the driving pulse to be output in a second position control period following the first position control period based on the position profile; and a driving controller configured for outputting the driving pulse having the number of outputs calculated by the pulse calculation unit to the motor driving module when a second position calculation interrupt notifying a start time-point of the second position control period is generated.

9 Claims, 5 Drawing Sheets

(58) Field of Classification Search
CPC ...... H02P 1/24; H02P 1/42; H02P 3/18; H02P 8/00; H02P 21/00; H02P 23/00; H02P 27/00; H02K 23/00; H02K 37/00
USPC ..... 318/34, 35, 37, 560, 561, 685, 696, 599, 318/400.13, 400.14, 700, 701, 721, 779, 318/799, 811, 437, 568.2, 568.23
See application file for complete search history.

(56) References Cited

U.S. PATENT DOCUMENTS

| | | |
|---|---|---|
| 8,890,457 B2 | 11/2014 | Aas et al. |
| 9,928,184 B2 * | 3/2018 | Suzuki .................... G06F 13/24 |
| 2014/0149612 A1 | 5/2014 | Suzuki et al. |
| 2018/0120810 A1 * | 5/2018 | Sawaragi ............. G01B 21/045 |

* cited by examiner

POSITION CONTROL DEVICE BASED ON PROGRAMMABLE LOGIC CONTROLLER

CROSS-REFERENCE TO RELATED APPLICATIONS

Pursuant to 35 U.S.C. § 119(a), this application claims the benefit of earlier filing date and right of priority to Korean Application No. 10-2018-0047898, filed on Apr. 25, 2018, the disclosure of which is incorporated herein by reference in its entirety.

BACKGROUND

1. Technical Field

The present disclosure relates to a position control device based on a PLC (programmable logic controller), and, more specifically, to a PLC-based position control device for accurately moving a movable object to a determined target position.

2. Description of the Related Art

A PLC (Programmable Logic Controller) is connected to various servo driving devices or stepping motor control driving devices, and performs high precision position control using a driving pulse. The PLC may allow a movable object (workpiece, tool), etc. to be moved from a current position to a set target position precisely at a set speed.

It may be difficult to miniaturize a PLC device using a dedicated ASIC that outputs the driving pulse. A manufacturing cost thereof may be increased. Conversely, a PLC device that does not employ the dedicated ASIC has a low precision in a position control.

In recent years, PLCs capable of performing multi-axis control using a plurality of channels or motors have been developed.

SUMMARY

The present disclosure is to provide a PLC-based position control device for accurately moving a movable object to a determined target position.

The purposes of the present disclosure are not limited to the above-mentioned purposes. Other purposes and advantages of the present disclosure, as not mentioned above, may be understood from the following descriptions and more clearly understood from the embodiments of the present disclosure. Further, it will be readily appreciated that the objects and advantages of the present disclosure may be realized by features and combinations thereof as disclosed in the claims.

In one aspect of the present disclosure, there is provided a device for controlling a position based on a programmable logic controller (PLC), the device comprising: a motor driving module configured to drive a motor to move a movable object; an input module configured to input a position command for determining a target position of the movable object; and a control module configured to output a driving pulse for operating the motor driving module based on the position command, wherein the control module includes: a profile creation unit configured for creating the position profile based on the position command when a first position calculation interrupt is generated in a first position control period; a pulse calculation unit configured for calculating a number of outputs of the driving pulse to be output in a second position control period following the first position control period based on the position profile; and a driving controller configured for outputting the driving pulse having the number of outputs calculated by the pulse calculation unit to the motor driving module when a second position calculation interrupt notifying a start time-point of the second position control period is generated.

In one embodiment, the control module may further include: a first interrupt generation unit configured for generating the first and second position calculation interrupts; and a second interrupt generation unit configured for generating a pulse interrupt for outputting the driving pulse prior to the start time-point of the second position control period.

In one embodiment, the profile creation unit may be configured for generating the position profile including an output rate of and a number of outputs of the driving pulse to be output in the second position control period, based on the position command.

In one embodiment, the pulse calculation unit may include a buffer for storing the number of the outputs of the driving pulse.

In one embodiment, the driving controller may be configured to be activated for outputting of the driving pulse having the number calculated by the pulse calculation unit upon receiving the pulse interrupt, wherein then the second position calculation interrupt is generated, the driving controller is configured to output the driving pulse.

In one embodiment, the first interrupt generation unit may be configured to: output the driving pulse; and at the same time, generate a third position calculation interrupt such that a number of outputs of a next driving pulse to be output in a third position control period following the second position control period is calculated by the pulse calculation unit.

In one embodiment, the driving controller may be configured to determine whether a generation time-point of the third position calculation interrupt coincides with a start time-point of the third position control period.

In one embodiment, the driving controller may be further configured to: upon determination that the generation time-point of the third position calculation interrupt is earlier than the start time-point of the third position control period, reduce an output rate of the next driving pulse to be output at the fourth position control period after the third position control period.

In one embodiment, the driving controller may be further configured to: upon determination that the generation time-point of the third position calculation interrupt is later than the start time-point of the third position control period, increase an output rate of the next driving pulse to be output at the fourth position control period after the third position control period.

The PLC-based position control device according to the present disclosure has an advantage in that an error accumulated in each position control period may be reduced by correcting the number and rate of driving pulses based on a set position control period.

Further, the PLC-based position control device according to the present disclosure sequentially generates position calculation interrupts for multi-axis control according to set position control periods to prevent delay of a driving pulse as generated in a corresponding position control period.

Further specific effects of the present disclosure as well as the effects as described above will be described in conduction with illustrations of specific details for carrying out the invention.

DETAILED DESCRIPTION

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well-known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Figure 1:
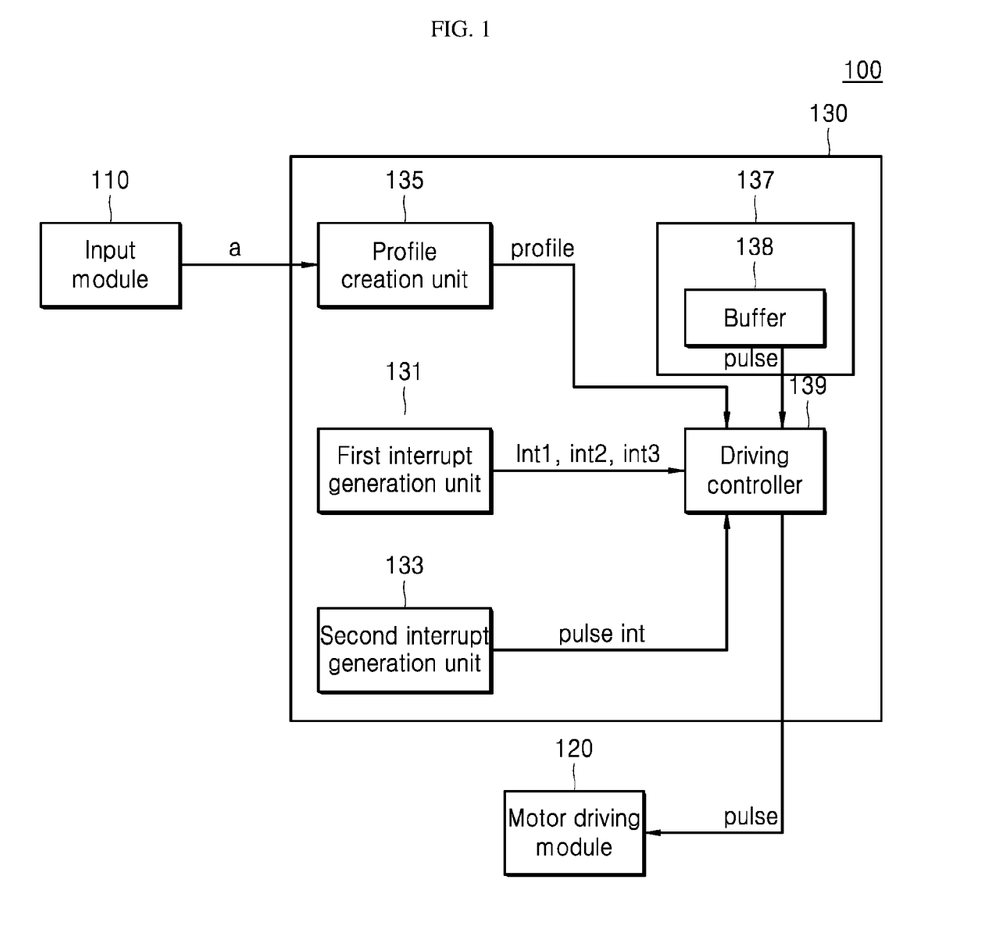
FIG. 1 is a control block diagram of a PLC-based position control device according to the present disclosure.

FIG. 1 is a control block diagram of a PLC-based position control device according to the present disclosure.

Referring to FIG. 1, a PLC-based position control device 100 may include an input module 110, a motor driving module 120, and a control module 130.

In this connection, the input module 110 may input a position command (a) to determine a target position of a movable object by a user or an operator.

The motor driving module 120 may actuate a servo motor controlling a plurality of axes to move a movable object to a target position.

In an embodiment, the motor driving module 120 may actuate a plurality of servo motors (not shown) controlling the plurality of axes based on a driving pulse output from the control module 130.

The control module 130 may include first and second interrupt generation units 131 and 133, a profile creation unit 135, a pulse calculation unit 137, and a driving controller 139.

When a position command (a) is input, the first interrupt generation unit 131 may generate a first position calculation interrupt (int1) such that a position profile corresponding to the position command (a) is created.

The first interrupt generation unit 131 may then output the first position calculation interrupt (int1) to the profile creation unit 135.

After outputting the first position calculation interrupt (int1), the first interrupt generation unit 131 may generate a position calculation interrupt int according to a position control period based on the position profile (profile) created in the profile creation unit 135.

When the position command (a) is input and the first position calculation interrupt (int1) output from the first interrupt generation unit 131 is input in the first position calculation period, the profile creation unit 135 may create a position profile (profile) corresponding to the position command a.

In this connection, the position profile may include output rate information of the driving pulses and number information of outputs of the driving pulses (pulse).

That is, the profile creation unit 135 may generate information on the driving pulse (pulse) based on the position command (a) input from the input module 110.

The pulse calculation unit 137 may calculate the number of outputs of driving pulses (pulse) to be output in a second position control period following the first position control period, based on the position profile (profile). The pulse calculation unit 137 may store the calculated number of outputs of the driving pulses (pulse) in a buffer 138.

In this regard, the second interrupt generation unit 133 may generate a pulse interrupt (pulse int) for outputting the driving pulse (pulse) and output the pulse interrupt (pulse int) to the driving controller 139 according to the position profile (profile), in synchronization with the second position control period, and prior to generation of a third position calculation interrupt (int3).

When the pulse interrupt (pulse int) is input from the second interrupt generation unit 133, the driving controller 139 is driven for outputting the driving pulse (pulse) calculated by the pulse calculation unit 137. When the second position calculation interrupt (int2) indicating a start time-point of the second position control period is input from the first interrupt generation unit 131, the driving controller 139 may output the driving pulse (pulse int) to the motor driving module 120.

After outputting the second position calculation interrupt (int2), the first interrupt generation unit 131 may generate a third position calculation interrupt (int3) that signals a start time-point of the third position control period after the second position control period.

In this connection, the driving controller 139 may determine whether a generation time-point or input time-point of the third position calculation interrupt (int3) coincides with a start time-point of the third position control period.

When the generation time-point of the third position calculation interrupt (int3) is earlier than the start time-point of the third position control period, the driving controller 139 may reduce an output rate of a next driving pulse to be output at a fourth position control period after the third position control period.

Further, when the generation time-point of the third position calculation interrupt (int3) is later than the start time-point of the third position control period, the driving controller 139 may increase the output rate of the next driving pulse to be output at the fourth position control period following the third position control period.

The driving controller 139 compares the generation time-point of the position calculation interrupt (int) with the start time-point of the position control period. Then, the controller 139 adjusts the output rate of the driving pulse to be output in the next position control period based on the comparison result. Accordingly, the delay of the start time point of the position control period may be prevented.

Further, the driving controller 139 varies the start time-point of the position control period of each of the plurality of servomotors at a predetermined time interval. Accordingly, there is an advantage that the delay of the driving pulse supplied to each of the plurality of servomotors may be prevented.

Figure 2:
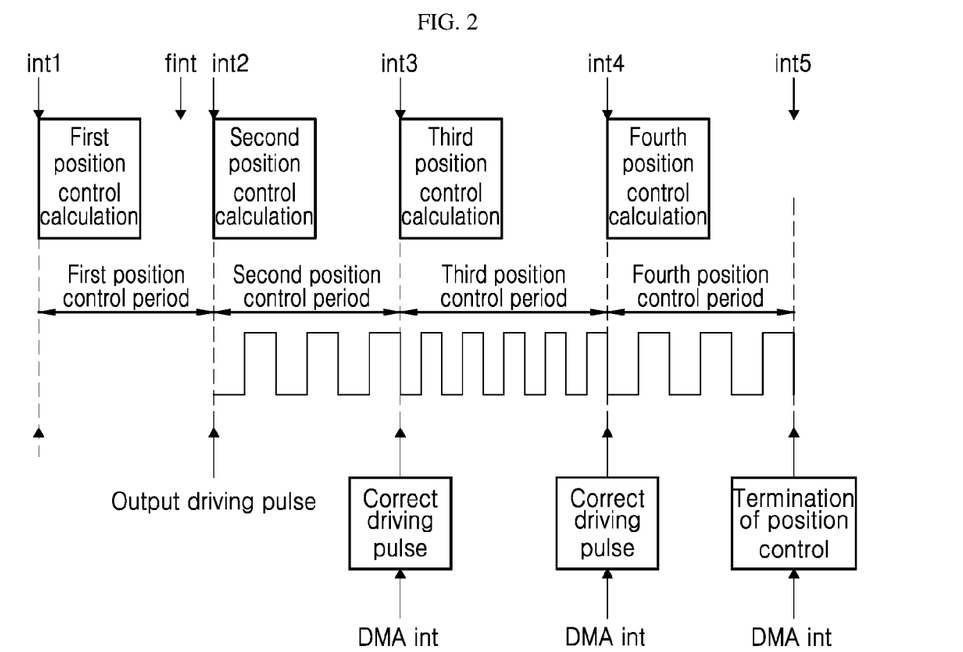
FIG. 2 is a timing diagram showing a driving pulse output from the PLC-based position control device according to the present disclosure.

FIG. 2 is a timing diagram showing the driving pulse output from the PLC-based position control device according to the present disclosure.

FIG. 2 is a timing diagram showing generation time points of first to fifth position calculation interrupts (int1 to int5), pulse interrupts (pulse ints), and correction interrupts (DMA ints), and timing of supplying driving pulses (pulses).

When the position command (a) is input in the first position control period where the driving pulse (pulse) is not output, the control module 130 creates the position profile (profile), and, at the same time, the module 130 generates the first position calculation interrupt (int1) to calculate the number of outputs of the driving pulse to be output in the second position control period.

The control module 130 generates the pulse interrupt (fint) prior to the end time-point of the first position control period. Thus, the module 130 may output the driving pulse (pulse) in synchronization with the second position control period and before a start time-point of the next second position control period.

In this connection, at the start time-point of the second position control period, the control module 130 generates the second position calculation interrupt int2 to calculate the number of outputs of the driving pulse (pulse) to be output at the third position control period.

At the end time-point of the second position control period or at the start time-point of the third position control period, the control module 130 generates the third position calculation interrupt (int3) to calculate the number of outputs of the driving pulse (pulse) to be output at the fourth position control period.

Further, at the end time point of the second position control period or at the start time-point of the third position control period, the control module 130 generates a correction interrupt (DMA int) to correct the output rate of the driving pulse to be output at the fourth position control period.

The correction interrupt (DMA int) refers to an interrupt for correcting the output rate of the driving pulse (pulse) in order to prevent the delay of the driving pulse to be output in the third position control period.

When the correction interrupt (DMA int) is generated, the control module 130 compares the generation time-point of the third position calculation interrupt (int3) with the start time-point of the third position control period, the module 130 may correct the output rate of the driving pulse (pulse) based on the comparison result.

Thus, the control module 130 may prevent the delay of the driving pulse (pulse) output between the current position control period and the next position control period.

At the end time-point of the third position control period or at the start time-point of the fourth position control period, the control module 130 generates a fourth position calculation interrupt (int4) to calculate the number of outputs of the driving pulse (pulse) to be output at a fifth position control period. The control module 130 may repeatedly perform the above procedure until the end time-point of the position control recorded in the position profile to correct the output rate of the driving pulse (pulse).

Figure 3:
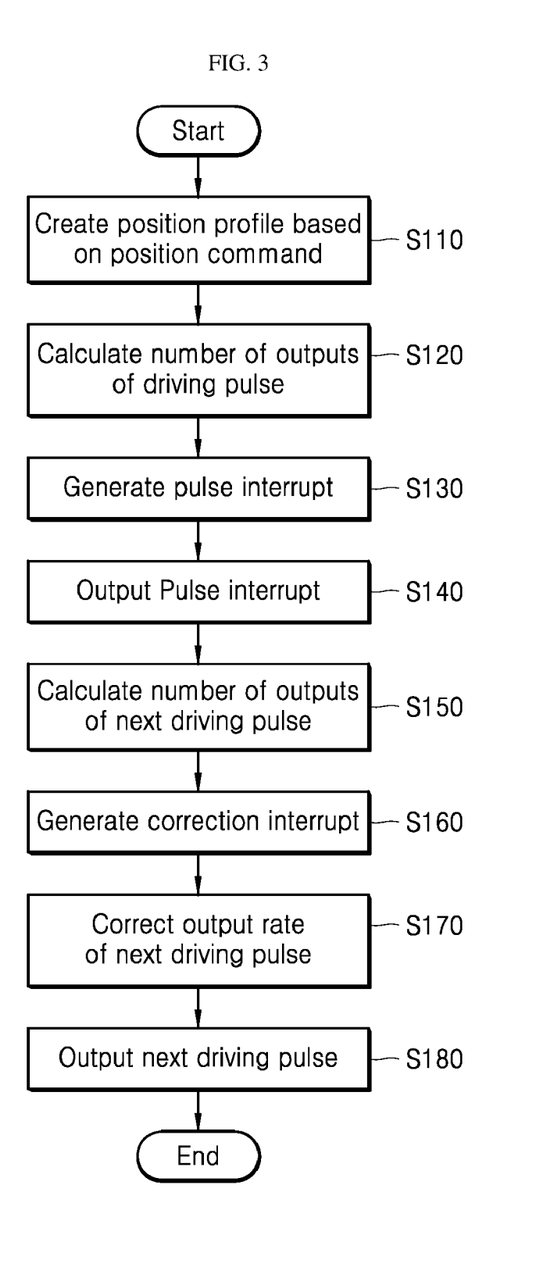
FIG. 3 is a flowchart showing an operation method of the PLC-based position control device according to the present disclosure.

FIG. 3 is a flowchart showing an operation method of a PLC-based position control device according to the present disclosure.

Referring to FIG. 3, when the position command (a) is input in the first position control period, the control module 130 of the position control device 100 may create the position profile (profile) S110.

The control module 130 may generate the first position calculation interrupt (int1) based on the position profile (profile). The module 130 may calculate the number of outputs of the driving pulse (pulse) to be output in the second position control period after the first position control period S120.

The control module 130 may generate the pulse interrupt (pulse int) for outputting the driving pulse (pulse) at the start time point of the second position control period or the end time-point of the first position control period, that is, in association with the second position control period S130.

Then, when the second position calculation interrupt (int2) indicating the start time-point of the second position control period is generated, the control module 130 may output the driving pulse (pulse) to the motor driving module 120 at S140.

At the generation time-point of the second position calculation interrupt (int2), that is, the start time point of the second position control period, the control module 130 may also calculate the number of driving pulses (pulse) to be output at the next third position control period S150.

The control module 130 may generate the third position calculation interrupt (int1) and the correction interrupt (DMA int) at the start time-point of the third position control period S160.

When the correction interrupt (DMA int) is generated, the control module 130 may also correct the output rate of the driving pulse (pulse) to be output at the third position control period S170.

The control module 130 may supply the driving pulse (pulse) having the corrected output rate to the motor driving module 120 in the third position control period. The module 130 may repeat the operations S150 to S170 until a time-point at which the position control period ends based on the position profile.

For example, when the position control period ends at the fourth position control period based on the position profile, the control module 130 may correct, at the start time-point of the third position control period, the driving pulse (pulse) to be output at the next position control period and the output rate of the driving pulse (pulse).

Figure 4:
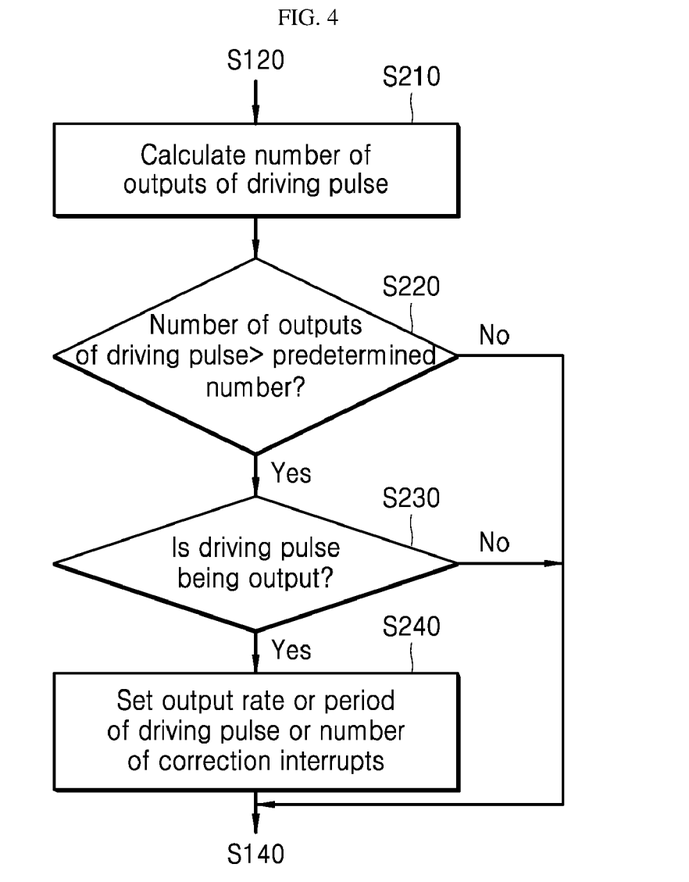
FIG. 4 is a flowchart showing an operation method of a process S130 shown in FIG. 3.

FIG. 4 is a flowchart showing an operation method of the process S130 shown in FIG. 3.

Referring to FIG. 4, the control module 130 generates the pulse interrupt (pulse int) for the output of the driving pulse (pulse) before the generation of the second position calculation interrupt (int2) S210.

The control module 130 determines whether the number of outputs of the driving pulse (pulse) is greater than a predetermined number. When the number of outputs of the driving pulse (pulse) is greater than the predetermined number, the module 130 may determine whether or not the driving pulse is being output.

In this connection, in operation S220, when the number of outputs of the driving pulse (pulse) is smaller than or equal to the predetermined number, or when the driving pulse is being output at operation S230, the control module 130 ends generation of the pulse interrupt (pulse int).

When it is determined in S230 that the driving pulse is not being output, the control module 130 may set the output rate or period of the driving pulse (pulse), or the number of the correction interrupts (DMA ints) based on the position profile S240.

Figure 5:
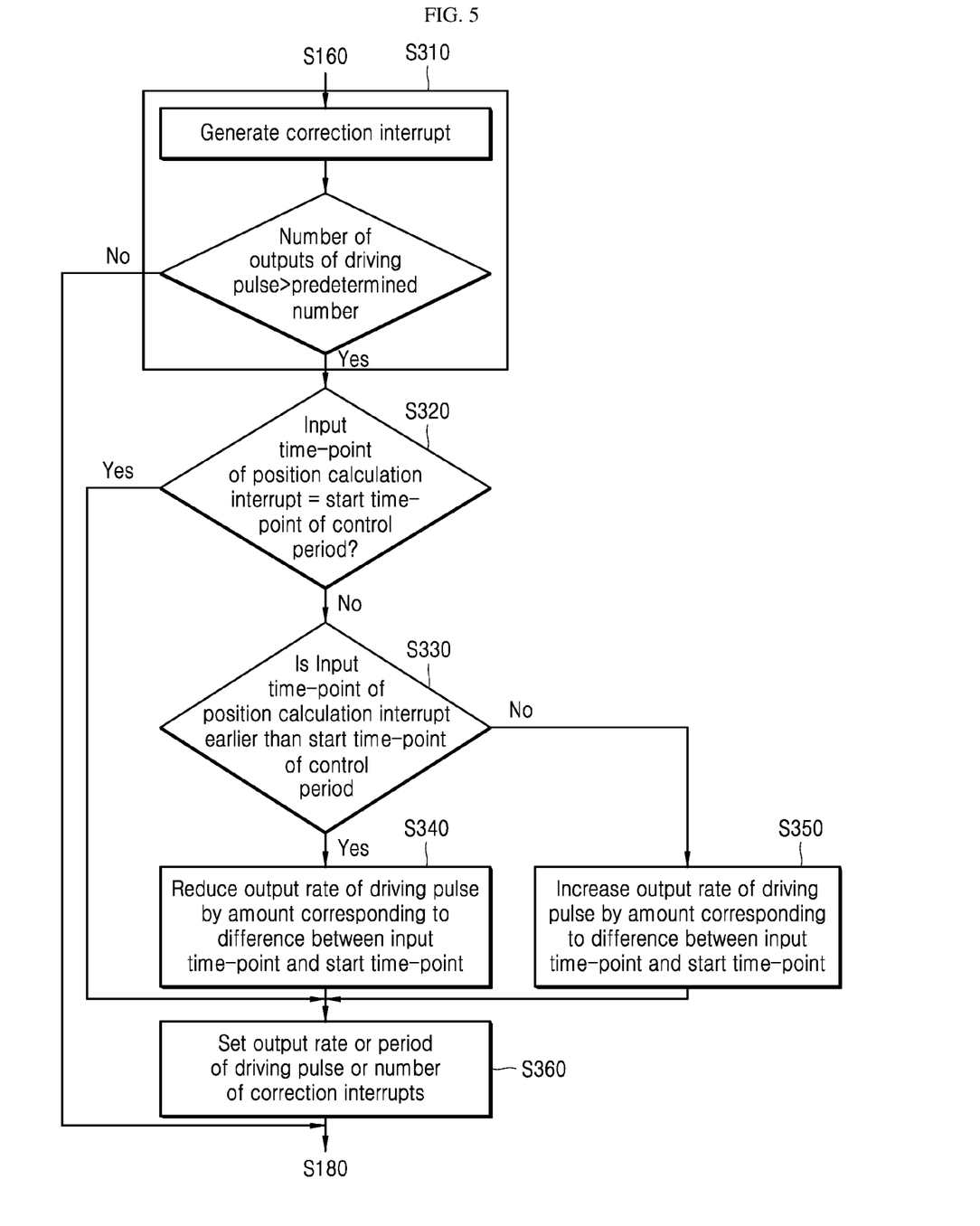
FIG. 5 is a flowchart showing an operation method of a process S170 shown in FIG. 3.

FIG. 5 is a flowchart showing an operation method of the process S170 shown in FIG. 3.

When the correction interrupt (DMA int) is generated, the control module 130 determines whether the number of outputs of the driving pulse (pulse) to be output at the third position control period is greater than a predetermined number S310.

The control module 130 determines whether the input time-point of the third position calculation interrupt (int3) coincides with the set start time-point of the third position control period S320.

When it is determined that the input time-point of the third position calculation interrupt (int3) coincides with the start time-point of the third position control period, the control module 130 performs an operation S360 as described later.

Further, when the input time-point of the third position calculation interrupt (int3) does not coincide with the start time-point of the third position control period, the control module 130 determines whether the input time-point of the third position calculation interrupt (int3) is earlier than the start time-point of the third position control period S330.

When it is determined based on the result of the operation S330 that the input time-point of the third position calculation interrupt (int3) is earlier than the start time-point of the third position control period, the control module 130 reduces the output rate of the driving pulse (pulse) by an amount corresponding to the difference between the input time-point and the start time-point S340.

When it is determined based on the result of the operation S330 that the input time-point of the third position calculation interrupt (int1) is later than the start time-point of the third position control period, the control module 130 increases the output rate of the driving pulse (pulse) by an amount corresponding to the difference between the input time-point and the start time-point S350.

After the operation S340 and operation S350, the control module 130 resets the output rate or period of the driving pulse (pulse) or the number of the correction interrupts (DMA ints) S360.

The foregoing disclosure is subject to various substitutions, modifications, and alterations by those skilled in the art to which the present disclosure belongs, without departing from the technical idea of the present disclosure. Therefore, the present disclosure is not limited to the above-described embodiment and the accompanying drawings.

What is claimed is:

1. A device for controlling a position based on a programmable logic controller (PLC), the device comprising:
a motor driving module configured to drive a motor to move a movable object;
an input module configured to input a position command for determining a target position of the movable object; and
a control module configured to output a driving pulse for operating the motor driving module based on the position command,
wherein the control module includes:
a profile creation unit configured for creating the position profile based on the position command when a first position calculation interrupt is generated in a first position control period;
a pulse calculation unit configured for calculating a number of outputs of the driving pulse to be output in a second position control period following the first position control period based on the position profile; and
a driving controller configured for outputting the driving pulse having the number of outputs calculated by the pulse calculation unit to the motor driving module when a second position calculation interrupt notifying a start time-point of the second position control period is generated.

2. The device of claim 1, wherein the control module further includes:
a first interrupt generation unit configured for generating the first and second position calculation interrupts; and
a second interrupt generation unit configured for generating a pulse interrupt for outputting the driving pulse prior to the start time-point of the second position control period.

3. The device of claim 2, wherein the profile creation unit is configured for generating the position profile including an output rate of and a number of outputs of the driving pulse to be output in the second position control period, based on the position command.

4. The device of claim 2, wherein the pulse calculation unit includes a buffer for storing the number of the outputs of the driving pulse.

5. The device of claim 2, wherein the driving controller is configured to be activated for outputting of the driving pulse having the number calculated by the pulse calculation unit upon receiving the pulse interrupt,
wherein then the second position calculation interrupt is generated, the driving controller is configured to output the driving pulse.

6. The device of claim 2, wherein the first interrupt generation unit is configured to:
output the driving pulse; and
at the same time, generate a third position calculation interrupt such that a number of outputs of a next driving pulse to be output in a third position control period following the second position control period is calculated by the pulse calculation unit.

7. The device of claim 6, wherein the driving controller is configured to determine whether a generation time-point of the third position calculation interrupt coincides with a start time-point of the third position control period.

8. The device of claim 7, wherein the driving controller is further configured:
upon determination that the generation time-point of the third position calculation interrupt is earlier than the start time-point of the third position control period,
to reduce an output rate of the next driving pulse to be output at the fourth position control period after the third position control period.

9. The device of claim 7, wherein the driving controller is further configured:
upon determination that the generation time-point of the third position calculation interrupt is later than the start time-point of the third position control period,
to increase an output rate of the next driving pulse to be output at the fourth position control period after the third position control period.

* * * * *